Aug. 3, 1948.　　　F. D. FRISBY ET AL　　　2,446,224
HYDRAULIC CONTROL OIL RING
Filed May 3, 1945

INVENTOR.
Frank D. Frisby and
BY Melvin W. Marien.

By Harry L. Binner
atty.

Patented Aug. 3, 1948

2,446,224

UNITED STATES PATENT OFFICE 2,446,224

HYDRAULIC CONTROL OIL RING

Frank D. Frisby and Melvin W. Marien, St. Louis, Mo., assignors to Ramsey Accessories Manufacturing Corporation, St. Louis, Mo., a corporation of Missouri Application May 3, 1945, Serial No. 591,671

1 Claim. (Cl. 309—44)

Our invention has relation to improvements in oil sealing rings for hydraulic control activating pistons (such as employed in hydraulic brakes) and it consists in the novel features of construction more fully set forth in the specification and pointed out in the claim.

Figure 1:
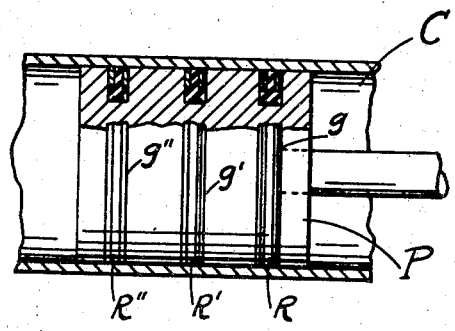
Figure 2:
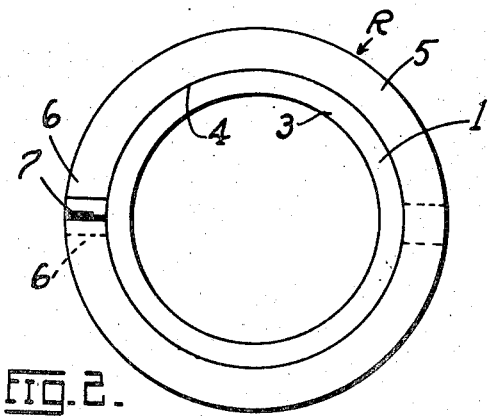
Figure 3:
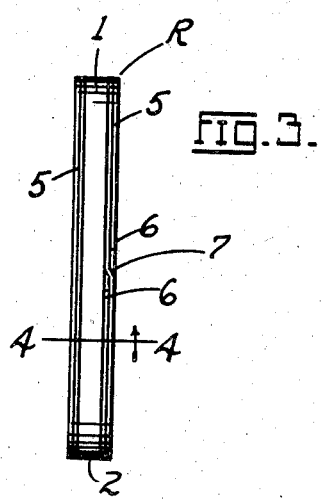
Figure 4:
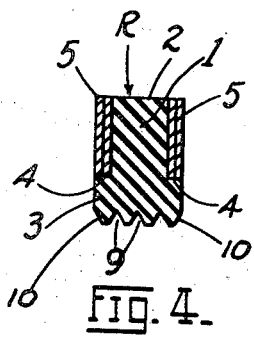
Figure 5:
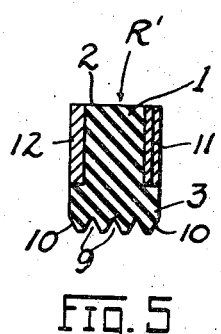
Figure 6:
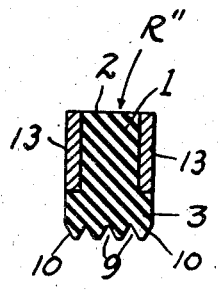

The invention is directed primarily to a composite type of ring employing both rubber (or an equivalent material) and spring steel, cast iron or plastic operating as a unit to prevent leakage of oil past the piston and thus maintain the maximum operating pressure. It has for its principal objects the provision of an effective sealing ring that will have a long life and exert a high unit pressure on the cylinder wall and be operative over an extremely wide temperature range. Other advantages will be better apparent from a detailed description of the invention in connection with the accompanying drawings, in which Figure 1 is a longitudinal middle section of a conventional type hydraulic oil control cylinder and piston (partly in elevation) equipped with our improved sealing rings; Figure 2 is a side view of the sealing ring at the high pressure end of the piston; Figure 3 is an edge view thereof; Figure 4 is an enlarged cross section taken on the line 4—4 of Figure 3; Figures 5 and 6 are cross section views on the order of Figure 4 but of modified forms of sealing rings.

Referring to the drawings, and for the present Figures 1 to 4 inclusive, C represents a hydraulic control cylinder in which a piston P operates under hydraulic pressure obtained in any well known manner. The effectiveness of the piston P as an activating device depends, essentially, on the efficiency of the oil seal between piston and cylinder. In the present instance, this seal is obtained by three sealing rings R, R' and R" made according to our invention.

Ring R is seated in a groove $g$ at the high pressure end of the piston, while rings R' and R" follow in order and are seated in grooves $g'$ and $g''$ respectively. Each of the rings is of composite construction in that it is formed of both spring metal and rubber or its equivalent. We shall describe them in order.

Ring R (Figures 2, 3 and 4) has a rubber component 1, T-shaped in cross section with its flange 2 extending outwardly from the center of its base 3. Shoulders 4, 4 are thus provided to receive helical, spring steel (or plastic) rings 5, 5 of two coils each. The ends 6, 6 of the respective coils are spaced circumferentially and the part of the helix between the coils has a slight offset 7 so that each coil may lie entirely in one plane and the two coils in parallel planes. To this extent the rings 5, 5 are not truly helical as what would normally be the pitch of the helix is accumulated in the offset 8. However, the winding and unwinding action of the helical spring is retained together with its circularity while either in contracted or expanded condition. This constant circularity of coils insures that the rings 5, 5 will contact the cylinder C snugly and with uniform pressure even as they expand and contract under slight imperfections and irregularities in the contour of the cylinder wall. Obviously, the rings 5, 5 are under tension in the cylinder. The rings 5, 5 fit snugly on shoulders 4, 4 and against flange 2 of rubber component 1, and the assembled ring R is slightly deeper radially than groove $g$ so that it will expand laterally in the groove when confined within the cylinder. In order to permit this expansion, a series of circumferential V-shaped grooves 9, 9 are provided on the inside surface of rubber component 1, and the inner marginal edges 10, 10 of said component are beveled (Figure 4). Since the diametrically expanding action of helical rings 5, 5 cause them to adhere closely to the cylinder wall and the lateral expanding action of the rubber component 1 causes said rings to adhere closely to the sides of groove $g$, there is little opportunity for oil to leak past the piston P as it is operated back and forth in its cylinder C.

The inside diameter of the ring component 1 is slightly less than the diameter of the bottom of groove $g$ and the width across the base 3 is slightly less than the width of the groove so that when the ring component is placed in the groove, it will be circumferentially stretched and will tightly hug the groove bottom. Thus the component 1 is always under compression between the bottom of the groove $g$ and the cylinder wall. The steel or plastic ring components 5, 5 not only operate as oil scraper rings during the travel of piston P, but also protect the component 1 from damage by impact against the sides of the groove during the piston action and collapse under use.

In the modification shown in Figure 5, the rubber component 2 is embraced by one coiled component 11 and one plain split ring 12, while in the modification of Figure 6, two plain split rings 13, 13. Obviously, many different combinations are possible under our invention.

Having described our invention, we claim:

A piston ring comprising an endless annular component of rubber (or equivalent material) of T-shape cross section, a pair of annular spring elements disposed in intimate contact with the sides of the flange of the rubber component, and said rubber component having circumferential grooves on its inner cylindrical surface, and said spring elements being of the order of a helix to permit expansion and contraction without loss of circularity.

FRANK D. FRISBY.
MELVIN W. MARIEN.

REFERENCES CITED

The following references are of record in the file of this patent:

UNITED STATES PATENTS

| Number | Name | Date |
|---|---|---|
| 1,481,160 | Switzer | Jan. 15, 1924 |
| 1,612,039 | Miller | Dec. 28, 1926 |
| 2,019,757 | Loweke | Nov. 5, 1935 |
| 2,128,372 | Marien | Aug. 30, 1938 |
| 2,208,620 | Baisch | July 23, 1940 |
| 2,349,170 | Jackman | May 16, 1944 |

FOREIGN PATENTS

| Number | Country | Date |
|---|---|---|
| 522,024 | England | June 6, 1940 |
| 551,507 | England | Feb. 25, 1943 |